United States Patent [19]

Lipe

[11] Patent Number: 5,548,759
[45] Date of Patent: Aug. 20, 1996

[54] SYSTEM FOR STORING EXECUTABLE CODE WITHIN A RESOURCE DATA SECTION OF AN EXECUTABLE FILE

[75] Inventor: Ralph A. Lipe, Woodinville, Wash.

[73] Assignee: Microsoft Corporation, Redmond, Wash.

[21] Appl. No.: 584,824

[22] Filed: Jan. 11, 1996

Related U.S. Application Data

[63] Continuation of Ser. No. 271,058, Jul. 5, 1994, abandoned.

[51] Int. Cl.⁶ .................................................. G06F 17/30
[52] U.S. Cl. .......................................... 395/600; 395/700
[58] Field of Search ................................. 395/600, 700

[56] References Cited

PUBLICATIONS

Sered, Y., "Accessing HPFS Files from MS–DOS" Tech Specialist, pp. 27–36 Jul. 1991.
Ezzell, B., "Preview: Windows NT —The Power Under the Hood" PC Magazine, pp. 173–200 Jun. 15, 1993.
Duncan, R., "Design Goals and Implementation of the New High Performance File System" Microsoft Systems Journal, pp. 1–13 Sep. 1989.
Hogan, T., The Programmers PC Sourcebook, Microsoft Press, pp. 62–69, 288–388 1988.
Microsoft Windows, Version 3.1, Guide to Programming, Microsoft Corporation, 1987–92, pp. 342–343, 357, and 465.
Microsoft Windows, Version 3.1, Programmer's Reference, vol. 1, Microsoft Corporation, 1987–92, pp. 441–451.
Microsoft Windows, Version 3.1, Programmer's Reference, vol. 4, Microsoft Corporation, 1987–92, pp. 69–81.
Microsoft Windows, Version 3.1, Software Development Kit (SDK), Programmer's Reference, vol. 4, Chapter 7, Microsoft Corporation, 1992–95, p. 85.
"Using Custom Resources", Windows–DOS Developer's Journal, vol. 5, No. 7, p. 37 (7 pages), Jul. 1994.
Microsoft Windows Programmers Reference, vol. 1: Overview, pp. 441–451, vol. 4: Resources, pp. 69–81, 1992.

*Primary Examiner*—Thomas G. Black
*Assistant Examiner*—Peter Y. Wang
*Attorney, Agent, or Firm*—Jones & Askew

[57] ABSTRACT

Multiple files are combined into a single file (64a) in new executable format to operate a hardware or software device, such as a peripheral device (30a), while retaining compatibility with an operating system (40). The resources portion (98) of the single file is extended to put one or more non-executable file (96) and executable file (97) in the single file. A header includes a resources table that identifies the location of the non-executable files and executable files within the resources section. The executable file is accessed and loaded by the operating system (40) after the peripheral device (30a) is connected to the computer (10), and the executable file is used to operate the peripheral device (30a).

24 Claims, 4 Drawing Sheets

SYSTEM FOR STORING EXECUTABLE CODE WITHIN A RESOURCE DATA SECTION OF AN EXECUTABLE FILE

This is a continuation of application Ser. No. 08/271,058 filed Jul. 5, 1994, now abandoned.

TECHNICAL FIELD

The present invention relates to a method and apparatus for installing executable files on a computer, and more specifically relates to the use of a single file in new executable format encapsulating other executable files, such as device driver files.

BACKGROUND OF THE INVENTION

In the last decade, usage of personal computers has moved beyond the tasks of word processing and mathematical operations. Computers today are often portable, and are regularly connected to different systems that include different hardware, software, and/or peripheral devices. Thus, today's computers must be able to operate with a variety of hardware, software, and peripheral devices, including, for example, compact disk read-only-memory (generally referred to as "CD-ROM") devices, graphics cards, sound cards, and scanners. This new widespread and multifaceted use of the personal computer has placed a premium on making the personal computer "user friendly" during the connection or installation of new hardware or software devices, such as peripheral devices or adapter boards, with the computer.

An integral pan of making a computer "user friendly" is software commonly referred to as an operating system ("OS"). The OS is software that is typically run by a microprocessor within the computer. Typically, the OS controls the creation and deletion of files in memory, allocation of memory to application programs and other common functions that are performed by the microprocessor in controlling "basic operations" of the computer.

When operating systems for personal computers were first written, the nature of the hardware and software running under the OS was generally well known because of the limited types of commercially available devices and programs that could be used with the computer. For example, very early "disk" operating systems controlled little more than the random access memory hard disk drive, hence leading to the label for such older systems of "Disk Operating System" (DOS). The uses of the computer were limited by those few standard devices that could be controlled by the old DOS. The most common DOS for personal computers in the world was sold under the "MS-DOS" trademark, and was developed and marketed by the assignee to the present invention, Microsoft Corporation, of Redmond, Wash.

As can be expected, however, new and different peripheral devices were and are continuously being developed and connected to computers. Indeed, today's computers are regularly running several application programs at one time, and may be connected to a number of different peripheral devices. Moreover, the peripheral devices connected to the computer are frequently changed over time.

Software modules must be written to control these peripheral devices. One such software module is a graphical user interface operating system developed and marketed under the trademark "WINDOWS" by Microsoft Corporation, which is the assignee of the present invention. Graphical user interface operating systems, such as the OS sold under the "WINDOWS" trademark, support the running of multiple application programs simultaneously on a computer, and are familiar to those skilled in the art.

The newer operating systems are distinct from earlier operating systems in that files written for the newer operating systems are created in "new executable" format. Those skilled in the art will recognize the "new executable" format that is created when software is written, compiled and linked using certain compilers, such as the Microsoft C++7.0 Compiler included with the Windows Software Development Kit, sold by Microsoft Corporation. Reference to an "operating system" throughout this application refers to operating systems that operate upon software that is in new executable format, including but not limited to the OS sold under the "WINDOWS" trademark and operating systems compatible therewith. The new executable format is a file format that standardizes executable files for use with the operating systems, and is described in detail herein.

The operating systems provide for control over some hardware and software devices, such as certain makes of CD-ROM devices. However, because new types and makes of hardware and software devices are constantly being created, other software must still be layered on top of, or operate in conjunction with, the present OS. This often becomes apparent to the user when the user first attempts to use a new peripheral device connected to the computer. The peripheral device will not operate unless certain necessary files are installed on the computer.

The files needed in today's computers to control hardware or software devices, such as a peripheral device, include device driver files and library files. Both device driver and library files are executable files that can serve many functions, including to control and make possible the use of peripheral devices by the computer. A device driver file is a software module or program that the computer uses to "drive" or control software operations and peripheral devices. A library file is an executable software module containing commonly needed or used routines that is loaded when called by the OS, linked when needed, and may be removed from memory until it is needed again. A library driver calls and links the library files as necessary.

Frequently, device driver files are used to communicate with and control peripheral devices, such as printers, CD-ROMs, or modems, thereby linking the peripheral device to the OS. The device driver files are thus used in conjunction with the OS to control the peripheral device. A device driver file is therefore necessary when adding new hardware or software devices, or specific makes of devices, to a computer. A library file may be necessary to control the peripheral device.

The device driver and library files are shared by all application programs that use the peripheral device. The device driver and library files enable the computer to operate various hardware or software devices. Associated with library files and device driver files are non-executable text files, commonly called INF files by those in the industry. The INF file (named for the INF extension on the end of the file and the fact that the file contains information) is a non-executable text file containing set-up and installation information necessary for the computer to use the device driver and library files.

Other files, such as a virtual device driver ("VxD") file, may be necessary to operate a hardware or software device, such as a peripheral device attached to a computer. The VxD device driver file usually works in cooperation with a device driver file (DRV file). A VxD device driver file is a device driver that runs in Ring 0 protected mode of the microprocessor. The VxD device driver files extend the services provided by the operating system to take advantage of as many services as possible that are offered by newer versions of the operating system. Thus, the VxD device driver file is still another executable file that is needed to control a hardware or software device.

Also, other device driver files, such as an NT device driver, may be required or desirable to control a peripheral device. The NT driver file may be needed to utilize a peripheral device with the OS sold under the trademark "WINDOWS NT" by Microsoft Corporation. Thus, different operating systems may require different device driver files, creating further opportunities for confusing the user as to what files are needed in the computer.

The device driver file, VxD device driver file, NT device driver file, and library file referenced above are executable files that are frequently referred to as dynamic link library (DLL) files. DLL files are files in new executable format containing a single piece of code, such as a device driver, for execution by the OS.

As is familiar to those skilled in the art, DLL files are linked to an application program at run time (hence the name "dynamic link"). DLL files allow multiple applications to share a single software module. For example, if two applications are running simultaneously, and both use a particular function in a DLL file, both applications share a single copy of the DLL file to save memory. DLL files can be used to share software routines and data for purposes such as sharing hardware resources.

In addition to the files referenced above, the computer user also must install an application program that allows the computer to interact with and control the peripheral device. For example, connected to the computer a communications application program will control a modem to initiate a call and send data. Typically, a manufacturer supplies software (the application program) with the peripheral device to enable the computer to utilize the abilities of the peripheral device. However, the floppy disk carrying the application program often does not contain every file and/or program necessary to use the peripheral device.

Those skilled in the art will recognize a fundamental constraint of the above mentioned operating systems that affects the DLL files and has led to the confusing creation of all the above-referenced different files for performing different functions. Specifically, the operating systems will not support "multi-streaming" in executable files, such as the DLL. Thus, all of the above listed files must be separate and distinct. Furthermore, a single file can not contain executable code (such as a device driver file) and a non-executable text file (such as an INF file). These OS constraints have lead to the creation of all the different executable files mentioned above, such as device driver files and library files.

The ability to run "New Executable" format files and the inability to multistream are characteristics of the above-referenced operating system. These characteristics are likely to be preserved in future operating systems to maintain backward compatibility with older software. Preserving backward compatibility is imperative.

The maintenance of backward compatibility has a cost. To use a new peripheral device connected to a computer, it may be necessary to load an INF file and several device driver and/or library files that perform certain functions in the computer. The INF file, device driver file and library file must be available to use the peripheral device. Users of computers with current operating systems are thus faced with accessing and loading many different files, including an application program, to use a peripheral device.

For example, the user who buys a new peripheral device, such as a CD-ROM device or a scanner, may have to install a device driver file not previously loaded on the computer before the CD-ROM can be used. The user may have to contact a software manufacturer to get the device driver file for the new peripheral device, or try to obtain the software from other sources. Also, the user must ensure that the device driver file is appropriate for the OS (i.e., the OS sold under the trademark "WINDOWS NT" versus the OS sold under the trademark "WINDOWS 3.1"). Also, the appropriate INF file must be found and loaded on the computer.

Indeed, it is not uncommon that the several files needed to utilize a peripheral device or the like may be supplied separately, thereby requiring the user to individually obtain the files needed to use the device. Even if all the files are together, for example on a floppy disk, upon viewing the contents of the floppy disk containing an application program, multiple device driver files, and one or more INF files, the user may often be confused. Even if the user locates and obtains all the files necessary to operate the peripheral device, users generally will not understand where all of the files must be loaded in the computer. Indeed, the user may have to go through several steps to add a device driver file to the list of device driver files in the system. Similar steps may have to be taken to add the other needed files (i.e., INF file and library files) to the computer.

While this issue may seem like a relatively minor "one-time" problem, a novice computer user can be easily frustrated by such installation procedures. In addition, those in the computer industry predict that many, if not most, of the computers sold in the near future will be portable. Thus, a computer may be carried to different stations (i.e., home and office) where it may be connected to any number of different peripheral devices. The different files necessary for operating these devices need to be easily accessible at each location.

Unfortunately, this need to load multiple files on a computer for purposes such as to operate a peripheral device has generated complications that can make the computer less user friendly. For example, users often load only an application program, connect a peripheral device to a computer and then wonder why the peripheral device does not work. Or a user may give another user a device driver file. The second user will not be able to use the device driver file unless that user also obtained the corresponding INF file.

The currently discussed operating systems have partially addressed the above concern. The "click and drag" feature of these systems allow users to quickly move and copy files. However, despite easy movement of files via "click and drag", the task of loading multiple files on a computer will dissuade some users from fully utilizing the computer.

It would be desirable to have a system that reduces the number of files needed to install device driver files and/or library files for purposes such as to operate a hardware or software device, such as a peripheral device. By combining the files needed to operate a hardware or software device, the end user need access and load fewer files, thereby making installation of the peripheral device easier. Further, it would be desirable if such a system retained compatibility with currently available OS(s), including the OS sold under the "WINDOWS" trademark.

SUMMARY OF THE INVENTION

The present invention resolves the above-described problems in the art by combining several files into a single file in new executable format, thus retaining compatibility with currently available operating systems. Multiple non-executable text files and files containing an executable code segment (such as device driver files and library files) are combined into a single file. Thus, for example, when a peripheral device is connected to a computer, the appropriate executable files needed to operate the peripheral device are all within one file, and all the files can be recognized and loaded in computer memory for execution. Also, this single file conveniently includes non-executable files (such as INF files), to thereby provide all files necessary for installing a hardware or software device, such as a disk cache, an adapter card, or a peripheral device, on a computer.

The single file includes a resources section that is reserved for binary data. The resources section was specifically created to contain binary data, including bit maps, audio wave forms and the like.

The present invention recognizes a hitherto unknown use of the resources section of a single file in new executable format. Within the resources portion of the single file are placed as many executable files as desired. For example, the single file would contain all the device driver files needed for enabling a computer to operate a peripheral device. One or more non-executable text files that identify what files are needed to operate the peripheral device are also in the resources section of the single file. The executable files may be device driver files, library files, or any other executable code segments. Thus, the resources file is extended to put text files, such as an INF file, and files containing executable code segments, such as device driver files and library files, into the resources portion of the single file.

The single file in new executable format encapsulating other files is typically a dynamic link library (DLL) file. The DLL file includes the elements of a file in new executable format that are familiar to those skilled in the art. Specifically, a conventional DLL file includes headers, a section of executable code for use with a disk operating system, a section of executable code in new executable format for execution by the operating system, and a resources section devoted to storing binary data. In the present invention, the DLL file is expanded, and non-executable text files and executable code segments forming executable files are compiled and linked as part of the resources section. Thus, the DLL file can include, for example, multiple device driver files, library files, INF files, and other executable code segments and non-executable text. A resource table in one of the headers points to the different files in the resources section. Thus, the files within the DLL file can be accessed by and are compatible with operating systems as defined herein. However, multiple files are combined into a single file.

Described more specifically, new executable format DLL files, written for use with the operating system that forms the environment for use of the present invention, contain a "resources" portion or section. The resources to section of the DLL file is reserved for data in a binary format, and is conventionally used to store character strings, such as version information and dialog boxes, and bit maps. Files in the resource section are arranged into separate blocks of binary data, with a header used to identify the data in each block. Currently, software developers creating DLL file use the resource portion to hold binary data, such as for dialogue boxes and/or multimedia information (wave form audio, audio, bit maps). Often, a dialog box containing a short string of textual information (such as the version number of the DLL file) is included in a resources section. The data would be used, for example, to create the appropriate display on the screen.

In the present invention, executable files, such as device driver files, needed for supporting operation of software and hardware devices are in the DLL file. Multiple device driver files and INF files that are required when a new peripheral device is first connected to a computer are encapsulated in the resources section of the DLL file.

The DLL file with the encapsulated files needed to control and use a peripheral device is typically located on the computer, usually in the hard disk drive, or on a floppy disk. The present invention includes a method for accessing the files encapsulated within the DLL file for use on the computer. The method of installing the encapsulated files onto a computer typically will first entail identifying a hardware or software device, such as a peripheral device. A "device identification string" and other information is obtained from the identified hardware or software device. The particular DLL file containing the executable files needed to operate the peripheral device is determined using the information identified for the peripheral device.

Specifically, after identifying the peripheral device, all DLL files on the floppy disk and in the computer are examined to determine which DLL file(s) contain executable files that can be used to control and use the peripheral device. As set forth above, in each DLL file is a header containing a resources table, and non-executable text forming at least one text file and executable code segment(s) forming at least one executable file in the resources section. The resources table in the header in each DLL file is read to identify any enclosed non-executable text file(s). A non-executable text file is then read to determine if it contains a device identification string matching or compatible with the new peripheral device. If so, the executable file(s) within the DLL file include the executable code needed to operate the peripheral device. The executable files are then located in the DLL file, and are used by the computer to control the peripheral device.

The method for accessing files from within a DLL file for controlling a hardware or software device begins with the detection of the new hardware or software device connected to the computer. The OS then reads a device identification string from the device. Presume that the hardware or software device is a peripheral device in the present example. The OS reads a registry in response to detecting the peripheral device. The registry is a preloaded listing of information concerning hardware and software devices, including the device identification strings for devices already installed on the computer.

If an entry in the registry corresponds to the device identification string for the peripheral device connected to the computer, the computer already has installed the files necessary to operate the peripheral device. In this case, the OS will search in a directory dedicated to storing DLL files in computer memory. Upon locating each DLL file, the INF file in the resources section of each DLL file is analyzed to determine the contents of the DLL file. A listing of the device identification string for the peripheral device is compared with a listing in the INF file. If the INF file lists the exact device identification string for the peripheral device being connected to the computer, the DLL file has the necessary executable files embedded in the resources section for operating the peripheral device. A loader is called to retrieve the matching executable files from the DLL file. The loader will use the resources table to locate and retrieve the needed executable files, which can then be executed to control the peripheral device.

On the other hand, there may be no match to the device identification string for the new peripheral device in the registry. In this case, a master installer program is called. The master installer program calls the operating system to obtain more information concerning the peripheral device. Specifically, more information is obtained about other peripheral devices and device drivers that are "compatible" with the new peripheral device. The information includes compatible device identification strings. Device drivers written for compatible peripheral devices can be used to control the new peripheral device.

The master installer uses the information obtained from the operating system to initiate a new search in the computer memory to find DLL files for operating the peripheral device. Each DLL file is individually analyzed to determine if it contains an INF file. When the master installer program locates an INF file in the resources portion of a DLL file, the master installer will read the detailed information about the executable files in the DLL file from the INF file. The master installer program will compare the information obtained from the operating system with the listings in the INF file to determine if compatible device driver files, VxD device driver files, or the like, are in the DLL file. If the INF file lists the appropriate identification string(s), the DLL file has the executable files necessary to operate the peripheral device. The names of DLL files containing executable files capable of operating the new peripheral device are kept in a list while further searching of DLL files continues.

After searching on computer memory for the needed DLL files, the master installer program searches for the needed DLL files on the floppy disk. If necessary, the user will be prompted to put a floppy disk containing DLL files into the computer.

The master installer program will search within the DLL files on the floppy disk. The master installer will search for INF files in DLL files for device identification strings that match or are compatible with the new peripheral device.

Specifically, as set forth above, each DLL file is individually analyzed to determine if it contains an INF file. If the master installer program locates an INF file in the resources portion of a DLL file, the master installer will read the detailed information about the DLL file from the INF file. The master installer program will compare the information obtained from the operating system regarding the new peripheral device, and compatible devices, with the listing in each INF file to determine if the needed device driver file, or VxD device driver files, are in the DLL file. If the INF file lists the appropriate information, the DLL file has the executable files embedded in the resources section necessary to operate the peripheral device. The names of DLL files containing compatible or matching executable files are added to the list of DLL files that will operate the peripheral device.

All of the DLL files with executable files that can be used to operate the new peripheral device are thus kept in a list. After the hard disk and the floppy disk have been searched for all relevant DLL files, the files are rank ordered corresponding to which executable files are most appropriate for controlling the peripheral device. For example, if a DLL file contains the primary or matching device identification string for the new peripheral device, indicating that the executable files in the DLL file were created specifically for the peripheral device, that DLL file will be ranked the highest, and above a file that contains only a "compatible" device identification string. The highest ranking DLL file will be accessed and the executable files therein will be utilized. If the highest ranking file is on the floppy disk, the master installer accesses and copies the needed DLL file, including the executable files, onto the directory for DLL files in the computer.

The device identification string is added to the registry, along with information regarding the executable files that will drive the peripheral device. The chosen DLL file can thus be accessed as was set forth above concerning accessing the registry and finding a match to the device identification string for the new peripheral device. The peripheral device can then be utilized via the loaded executable files. Thus, only the single DLL file is needed for using the new peripheral device, without any requirement to find and manually load other files needed for control of the peripheral device.

Regardless of how the DLL file is brought into memory of the computer, the file will be stored in the above-referenced directory that is dedicated to storing DLL files. After a DLL file is in the dedicated directory in memory, the executable files within the resources section must still be loaded for execution. A resource table is included in the DLL file. A Type_Info entry is included for each of the files in the resources section of the DLL file. The Type_Info entry points to the executable data files(s) (device driver file and library file) and non-executable text files (INF file) that contain the needed files within the resources portion of the DLL file. For example, the Type_Info entry will point to a file called RT_VxD for the VxD device driver file.

The Type_Info structure also includes detailed information about the files in the resources section. For example, the size, location, handle and any flags used by the files are stored in the Type_Info structure. Furthermore, a "run offset" value guides the loader to the resources section within the DLL file that contains the needed files. The loader uses this to load the files found in the resources section of the DLL file.

Specifically, the loader program identifies the existence and location of the VxD device driver and library files using Type_Info, and loads the programs from the resources portion of the DLL file. The VxD device driver and library files are in line executable format, and the loader loads these files into the appropriate locations on the computer. For example, the VxD device driver file is indexed in the driver list and in the registry and placed in memory in the computer for execution. Thus, the VxD device driver file may be accessed and used by any application that needs to use the peripheral device.

Thus, it is an object of the present invention to provide a method of combining a number of separate files, including executable and non-executable files, into a single file in new executable format while retaining the full functionality of the separate files.

It is a further object of the present invention to combine previously separate files into a single file in new executable format so that only the single file need be accessed by a computer to install a peripheral device.

It is a further object of the present invention to provide a method of combining previously separate files, including multiple device driver files, into a DLL file so that only the single DLL file is needed to utilize a peripheral device.

It is a further object of the present invention to provide a method for conveniently connecting a peripheral device to a computer.

It is a further object of the present invention to provide a method for automating the loading onto a computer of files that are needed for controlling and utilizing a peripheral device connected to the computer.

That the present invention accomplishes these objects and overcomes the above cited drawbacks of the prior art will be apparent to those skilled in the art from the following description, the appended claims and the accompanying drawings.

DETAILED DESCRIPTION

Figure 1:
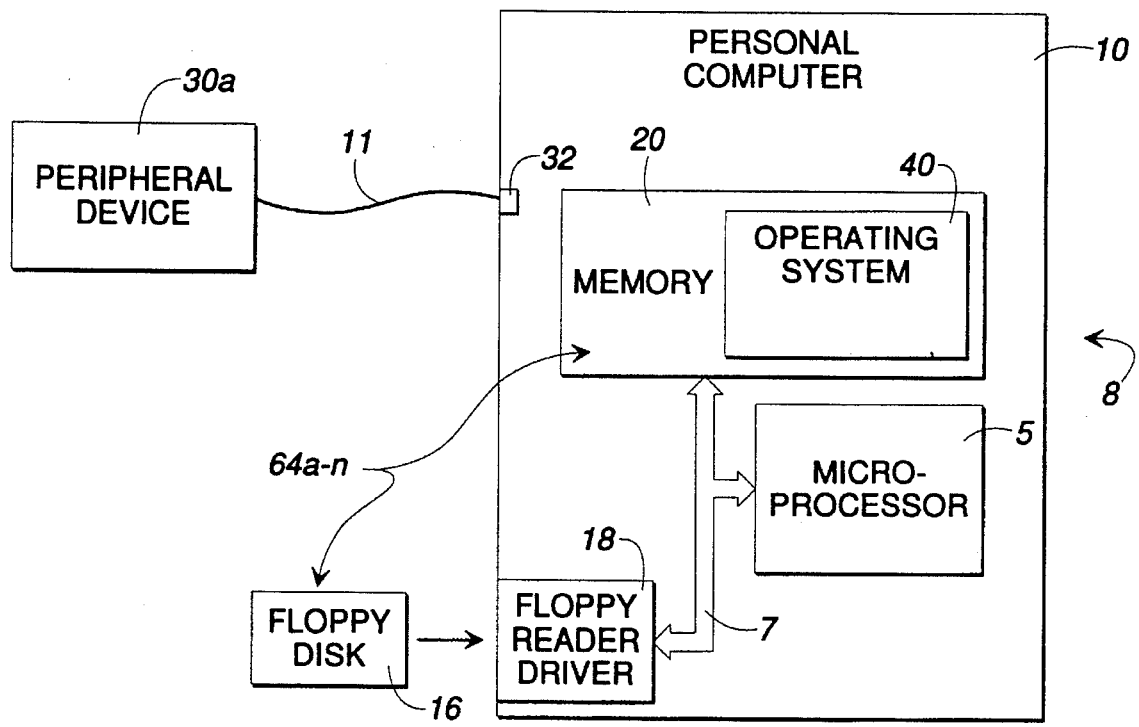
FIG. 1 is a block diagram of a computer system showing the preferred environment for accessing and using the single file in new executable format that encapsulates multiple files.

Turning next to the figures in which like numerals indicate like parts, FIG. 1 is a block diagram of a computer 10 within a computer system 8. The computer 10 is preferred for using the files encapsulated within a single file in new executable format. The single file in new executable format is preferably a dynamic link library (DLL) file 64a. Referring to FIG. 1, an operating system 40 recognizes and can access the multiple files stored within the single DLL file 64a. The combination of multiple files into one DLL file serves many purposes, such as to facilitate installation and use of a peripheral device 30a. Each of the DLL files 64a–n is a computer file that may be stored on any memory device, including in memory 20 of computer 10, or on floppy disk 16.

For example, if the peripheral device 30a is connected to the computer 10, a device driver file, library file, and INF file may be needed to use the peripheral device 30a. The preferred embodiment combines the above-listed three files into a single DLL file 64a, and the computer 10 will access and use the needed files from within the DLL file 64a.

Before discussing the specific details of the preferred DLL file 64a, the general environment of the computer system 8 that uses the DLL files is set forth. The preferred embodiment of the DLL file 64a is utilized in the computer system 8. The computer system 8 includes an International Business Machine Corporation ("IBM") personal computer 10, or compatible computer, operating using a graphical user interface operating system 40. The operating system 40 in the preferred embodiment is compatible with the operating systems sold under the "WINDOWS" trademark by the assignee of the present invention, Microsoft Corporation, and is familiar to those skilled in the art. Those skilled in the art will recognize that the preferred DLL file 64a is in new executable format and is compatible with, and executable by, the operating system 40. The operating system 40 as described herein is thus compatible with files in new executable format, such as DLL file 64a. The microprocessor 5 accesses memory 20, floppy disk reader 18, and other components in computer 10 via a control and data bus 7. The operating system 40 is stored in memory 20, along with other software modules/routines. Those skilled in the art are familiar with how the microprocessor 5 and operating system 40 operate to provide the functions performed by computer 10. The preferred microprocessor 5 is the 80486 microprocessor sold by Intel Corporation. Computer accessory components, such as a monitor, keyboard, etc., of the computer 10 are not described or shown herein, because they are known to those skilled in the art.

In the below description of the preferred embodiment, the single file encapsulating multiple files is a DLL file. However, the single file could be any file in new executable format (sometimes referred to by those skilled in the art as "New EXE Header Format"), familiar to those skilled in the art. The preferred DLL files 64a–n can be built in a manner set forth below using the Microsoft Corporation C/C++7.0 Compiler with the Windows 3.1 Software Development Kit ("SDK") or the Borland Corporation C++3.1 Compiler. In the preferred embodiment, the DLL files 64a–n are constructed with an "MWD)" extension, and the preferred DLL files 64a–n are sometimes referred to as MWD files. As is familiar to those skilled in the art, a dynamic link library file can have any number of different extensions, including ".EXE", ".FON" and ".DLL", which will all be recognized by the operating system 40. Another extension instead of "MWD", a header, or other identification means may be utilized to identify that a DLL file encapsulates device drivers and/or library files, as long as the protocol is consistent between the operating system 40 and the single file is in new executable format (FIG. 1).

Figure 2:
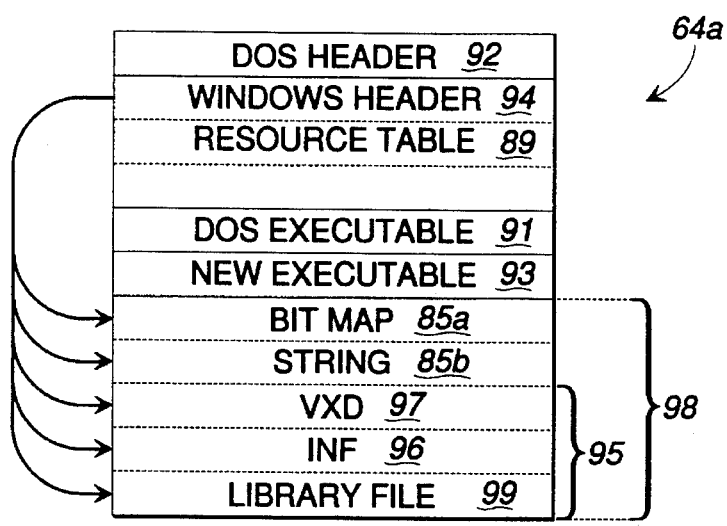
FIG. 2 is a diagram of the format for the preferred single file in new executable format that contains multiple files in the resources section.

Referring now to FIG. 2, a block diagram of the preferred DLL file 64a is shown. The DLL file 64a includes the sections familiar to those skilled in the art for a file to be in new executable format: headers 92 and 94, DOS executable portion or section 91, new executable portion or section 93, and a resource portion or section 98. However, in the preferred embodiment of the present invention, an MWD section 95 is appended to what is conventionally thought of as a file in new executable format to create the preferred DLL file 64a. The particular MWD section 95 shown in FIG. 2 includes an INF file 96, a VxD device driver file 97, and a library file 99. The MWD section 95 is included as part of the resources section 98 of the DLL file 64a. The MWD section 95 could contain any number of different files, each file containing executable code segments or non-executable text. The executable code segments could be device driver files, library files, an application program, or other code executable by the computer 10 and compatible with the operating system 40. The preferred DLL files 64a–n are thus "modified" versions of files in new executable format, however the DLL files 64a–n are operable as new executable format files with operating system 40.

The DLL file 64a contains all the files needed to operate the peripheral device 30a. Those skilled in the art are familiar with the overall structure of a file in new executable format written for operation on the operating system 40. The header 92 is a "disk operating system" (DOS) header, typically for use in retaining compatibility with traditional disk operating systems, such as the disk operating systems sold under the trademark "MS-DOS" by Microsoft Corporation. The header 92 is familiar to those skilled in the art when building a file in new executable format, and is primarily in such files to retain backward compatibility.

The header 94 is generally called a "WINDOWS" header by those skilled in the art. Those skilled in the art are familiar with the creation of a WINDOWS header using conventional software programming techniques, such as the software development programs listed above. In the preferred embodiment of the present invention, the header 94 includes a resources table 89 that acts as a pointer to identify and locate the files in the resources section 98. The resource table 89 is described in further detail below.

The DOS executable section 91 is typically a "stub" program that, upon execution of the DLL file 64a by the operating system 40, points to the new executable section 93. The DOS executable section 91 is familiar to those skilled in the art. The DOS executable section 91 is created upon compilation of the DLL file 64a using conventional software development techniques familiar to those skilled in the art. The header 92 and DOS executable section 91 are frequently considered one piece of software by those skilled in the art.

The new executable section 93 can be a device driver file or other executable code segment that is run by the operating system 40. Thus, the new executable section 93 is the conventional location of an executable file, such as the device driver file, library file, or other file needed to operate a peripheral device 30a. Only one file can be located in the new executable section 93 because the operating system 40 does not support multi-streaming.

A bit map file 85a and a string file 85b are located in the resources section 98. The bit map file 85a and string file 85b are both filled with binary data. For example, the bit map file 85a contains binary data to create bit map displays on a monitor, as is familiar to those skilled in the art.

The previously separate files are combined into a single binary format file in the MWD section 95 of the DLL file 64a. The name "MWD section" is used to indicate a portion of the DLL file 64a that includes the files added in the preferred embodiment, and is used herein because the preferred DLL file 64a is created with an MWD extension. In FIG. 2, the MWD section 95 is shown being coextensive with the resources section 98 of the DLL file 64a, along with the bit map and the string files, 85a and b, respectively. The MWD section 95 combines into the DLL file 64a, within the resources section 98, a VxD device driver file 97, a library file 99, an INF file 96, and could further include any other desired files. Thus, the user needs only the DLL file 64a, to perform whatever functions might require executable code, such as a device driver needed to use the peripheral device 30a. The VxD device driver file 97 and library file 99 are executable code segments that are separately stored as executable files, while the INF file 96 is a non-executable text file, also stored within the resources portion 98 of DLL file 64a.

Device drivers are typically in linear executable format, therefore the executable files (VxD device driver file 97 and library file 99) in the MWD section 95 are preferably compiled and stored in linear executable format. The executable files in the resources section will typically be built using the above referenced software development programs, wherein the resource script would be written in a conventional programming language, such as "C++", and wherein the script is compiled and added to the resources section 98 as if it were an ordinary binary data file. However, as will be familiar to those skilled in the art, these files could be in page executable format or any other data format generated by an appropriate compiler and executable by the operating system 40.

The structure of the INF file 96 is set forth in Table 1:

TABLE 1

| Section Name | Description |
| --- | --- |
| Version | Contains a simple header that identifies the INF definition under which this INF file was developed and the class of device this INF file describes. |

TABLE 1-continued

INF File Structure

| Section Name | Description |
| --- | --- |
| Manufacturer/ Device | Contains a two-level table of contents for this INF file. The Manufacturer section lists the manufacturers of devices in this INF file and the manufacturer name section lists all the devices in the INF file built by that manufacturer. These entries are displayed to the user and used to generate the appropriate registry entries. (There must always be at least one manufacturer.) |
| Install | Describes the device driver and some physical hardware attributes. This information is moved to the appropriate location in the registry by the master installer. This section also contains a pointer to the driver installation section. |
| Class | Defines a new class for this device. This section is optional. |
| Modules | Defines detection DLLs for the hardware described by this INF file. |
| Installation | Installation instructions for this device. |
| Strings | Contains all localizable strings, as an aid in localization. |

In the preferred embodiment, the INF file 96 is written in ASCII, as will be familiar to those skilled in the art. To write an ASCII file, such as the INF file 96, into binary format for placement in the resources portion 98 of the application program 64, an INF structure for the file called "ASCII Binary" is created. The information is stored in Intel Byte order in the resources portion 98 of the application program 64, although other data formats could be used. Portions of the INF file 96 naming the VxD device driver file 97 and library file 99 are written directly into a registry 56 (discussed below concerning FIG. 4) in the operating system 40. Thus, the VxD device driver file 97 and library file 99 in the computer 10 are available to the operating system 40 and other programs in the computer 10.

Figure 3:
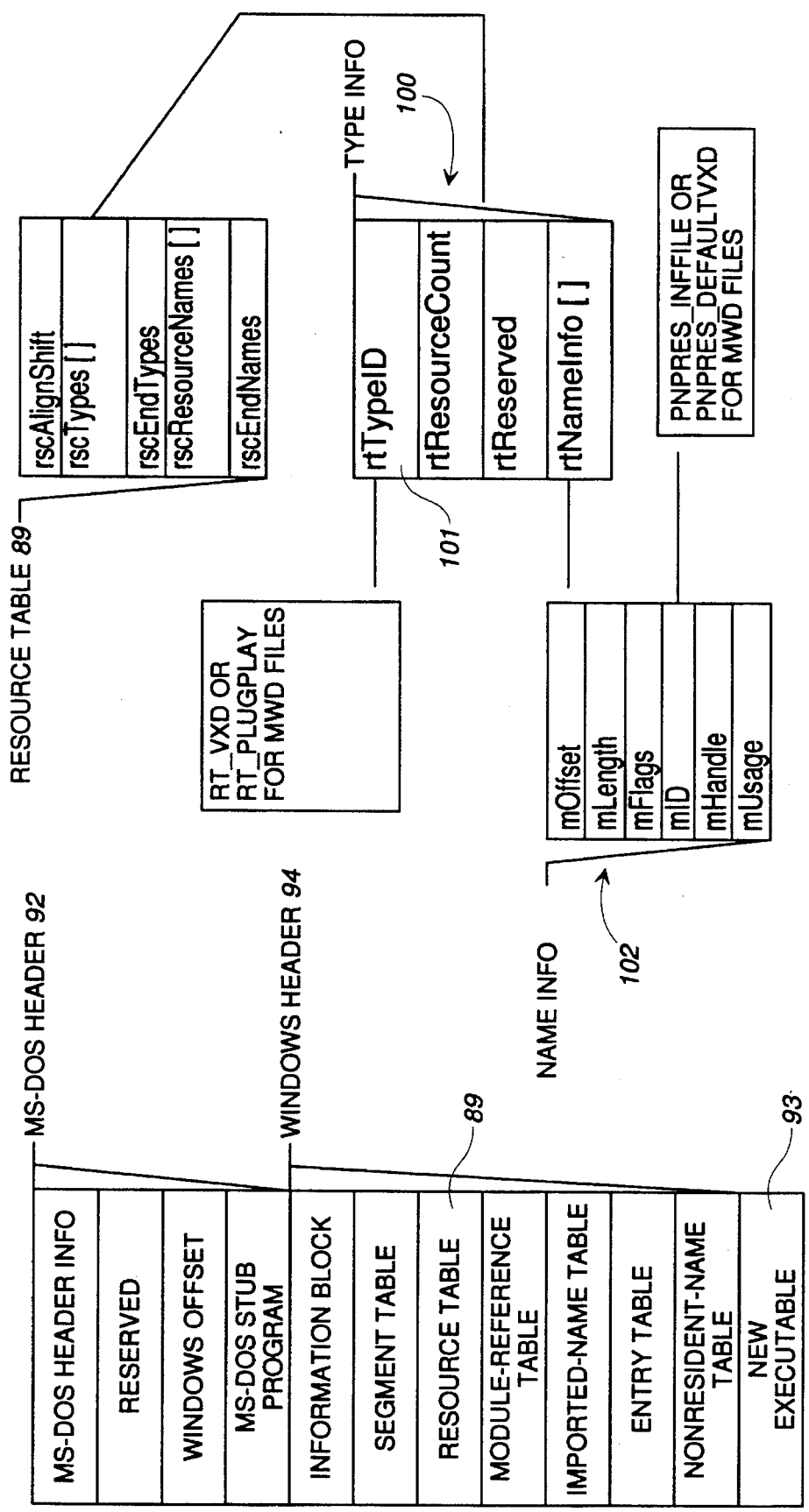
FIG. 3 is a detailed block diagram of the headers for the single file illustrated in FIG. 2.

FIG. 3 is a detailed block diagram of the headers of the DLL file 64a in FIG. 2. The column on the left hand side of FIG. 3 shows the headers 92 and 94. The resource table 89 is shown in the upper right section of FIG. 3, with the components of the resources table 89 being shown below the resources table 89.

The DOS executable section 91 is shown within the header 92 in FIG. 3. The DOS executable section 91 can thus be considered separate from the header 92, as in FIG. 3. The DOS executable section 91 is a stub program in the preferred embodiment, as discussed above. The new executable section 93 is shown appended to the header 94 in FIG. 3. The other sections of the header 92 not described in detail, such as the module reference and entry tables, store information for using the DLL file 64a in conjunction with the operating system 40 and other software in computer 10, as will be familiar to those skilled in the art. For example, software routines that have been imported are stored in the header 94.

Referring to FIGS. 1–3, the resource table 89 is included in the Windows header 94 of the DLL file 64a. A Type_Info entry 100 is included in table 89 for each of the INF file 96, VxD device driver file 97 and library file 99. The Type_Info entry 100 points to the INF file 96, VxD device driver file 97 and library file 99 within the DLL file 64a, as is indicated by the arrows from the resources table 89 to each file in the MWD section 95 in FIG. 2. For example, the Type_Info entry 100 (FIG. 3) will provide the offset to Resource_ Types_VxD for the VxD device driver file 97 in the MWD section 95, and to Resource_Types_PLUGPLAY for the INF file 96 in the DLL file 64a. The size, location, handle and any flags used by the files are stored in the Name_Information section 102. Furthermore, a "run offset" value acts as a pointer to the memory locations in the DLL file 64a that contain the needed files (non-executable binary INF file 96 or executable files, 97 and 99).

Also in the Type_Info structure 100 is detailed information about each of the files in Name_Information section 102. The individual files are identified by Type ID table 101. The Type ID table 101 differentiates between like files, for example between device driver files.

Those skilled in the art will recognize that the INF file 96, VxD device driver file 97 and library file 99 are encapsulated within the DLL file 64a. The Type_Info structure 100 and Name_Information section 102 in header 94 serve to identify the name and location of the encapsulated files in the resources section 98 of the DLL file 64a. Other locations in the DLL file 64a could be used to store information regarding the location of INF file 96, VxD device driver file 97 and library file 99.

Figure 4:
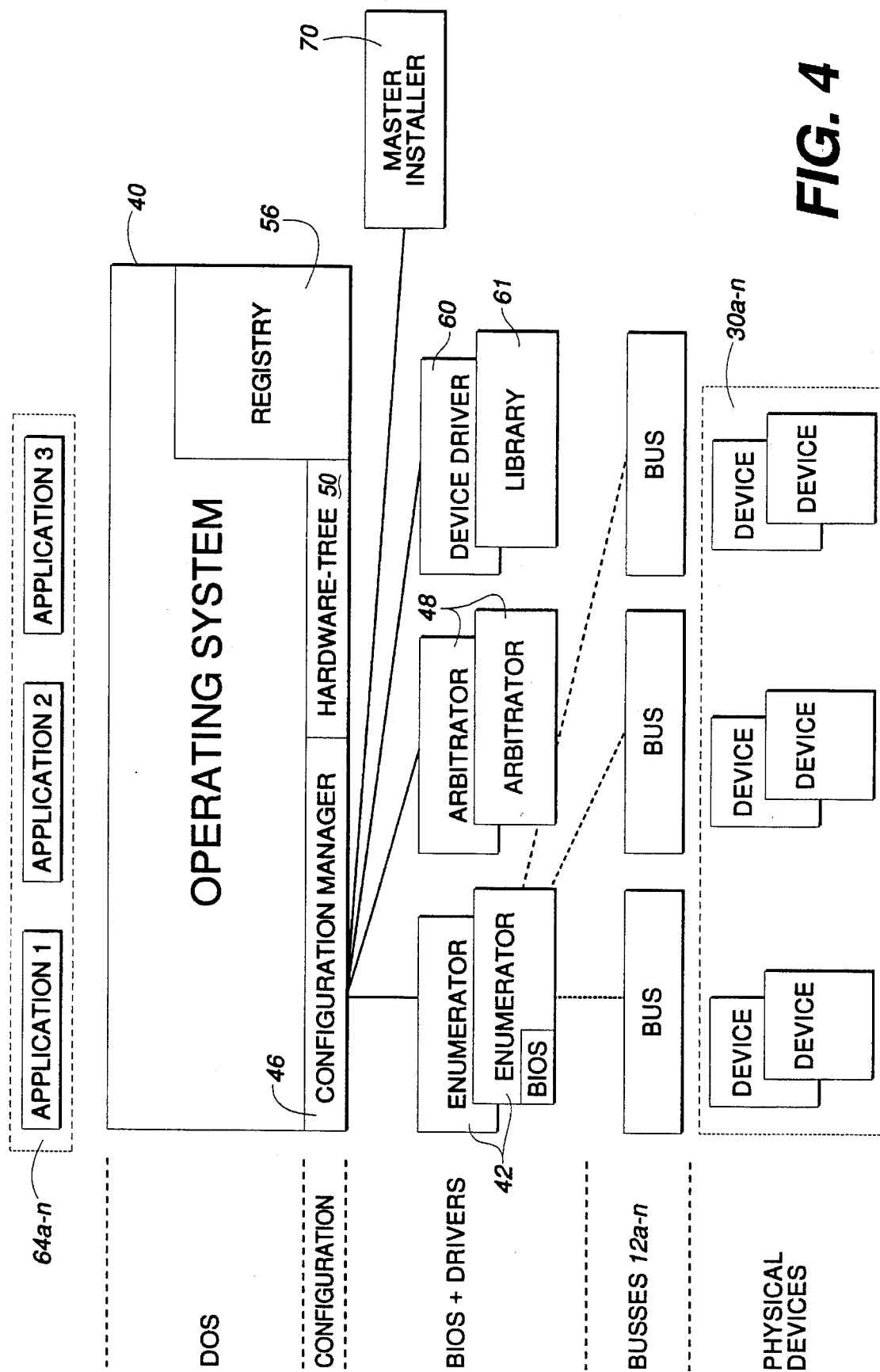
FIG. 4 is a relational block diagram of the software hierarchy in the memory of the computer in FIG. 1.

The MWD section 95 in the preferred embodiment may be built using the Microsoft Corporation C/C++7.0 Compiler with the Windows 3.1 Software Development Kit ("SDK") or the Borland Corporation C++3.1 Compiler. The resource compiler in the SDK will recognize and handle the resource types discussed above, such as RT_VxD. The INF file 96, the VxD device driver file 97 and the library file 99 within the MWD section 95 are specified in the header 94 (FIG. 4). For example, the resource script could include the RT_VxD and RT_PLUGPLAY entries. Further information about building the DLL file 64a is available from Microsoft Corporation, and in Microsoft Corporation documents entitled: "Plug & Play Specifications", "Device Information Files, Chapter 99", "Configuration Manager, Chapter 1", "Plug and Play ISA Specification", "Plug and Play Device Drivers, Chapter 1", "Plug and Play and PCMCIA", and "Plug and Play Introduction".

The above describes the preferred DLL file 64a. The DLL file 64a is a file that encapsulates previously separate files, including the INF file 96, VxD device driver file 97, and library file 99.

Next, the preferred method for utilizing the DLL file 64a is set forth. Broadly speaking, when a peripheral device 30a (FIG. 1) is connected to a computer 10, one or more device driver files specific to, or compatible with, the peripheral device 30a often must be loaded into the computer 10 to use the peripheral device 30a. In the preferred embodiment, the needed files are loaded from within the resources portion 89 of the DLL file 64a.

Those skilled in the art will recognize that the conventional method of reading a separate INF file and loading a separate device driver file could be performed in the below-described method if the appropriate DLL file is not available. Therefore, if the below method of accessing a DLL file fails conventional separate files, such as separate INF files and VxD device driver files, may be accessed and used.

A new hardware or software device, such as a peripheral device 30a, may be connected to or disconnected from the computer 10 at any time, including before or during use (hot connection) of the computer 10. Referring back to FIG. 1, the peripheral device 30a is connected to the computer 10 via a cable 11. Cable 11 may be twisted pair, fiber optic or any other hard-wire or other connection means that will support data transfer between computer 10 and peripheral device 30a. It will be apparent to those skilled in the art that the cable 11 may be replaced with wireless connection means, such as infrared or radio frequency communication. The cable 11 is connected to a small computer standard interface ("SCSI") port 32 in the present invention, although it may be connected to a modem port, printer port or other data input/output port familiar to those skilled in the art.

Alternatively, those skilled in the art will appreciate that the peripheral device 30a may be physically mounted to a dock on the internal bus (not shown) in the computer 10. For example, the peripheral device 30a can be mounted in an expansion slot on the internal bus inside the computer 10, or could be a software device (or module) in memory (not shown) of computer 10. The peripheral device 30a can thus include any device that is added or connected to the computer 10 to perform or supply a computer function, including hardware or software devices located internal or external to the computer 10.

The floppy disk 16 in FIG. 1 may contain DLL files 64a–n that include the needed INF file 96, VxD device driver file 97 and library file 99 for controlling the peripheral device 30a. The floppy disk 16 is loaded in reader 18, which is a floppy disk drive (Drive A in the present system), familiar to those skilled in the art. It will be apparent to those skilled in the art that other removable media may be used for providing the DLL files 64a–n to computer 10, instead of floppy disk 16, such as CD-ROM, removable hard drives and the like. Alternately, the DLL files 64a–n may be located in memory 20 (FIG. 1) in the computer 10 or at a remote site and accessed via a local or wide area network via a modem (not shown) or other media or means for carrying electronic data.

Before discussing the method for accessing and using the needed DLL file 64a with computer 10, the relevant portions of the operating system 40 for computer 10 are first described. FIG. 4 is a relational block diagram of the software hierarchy of the operating system 40 in FIG. 1 that is used to implement the preferred embodiment of the present invention. Referring to FIG. 4, the preferred operating system 40 includes software modules called enumerators 42, a configuration manager 46, resource arbitrators 48, a hardware tree 50 and a registry 56. Those skilled in the art will appreciate that conventional software development techniques can be used to develop the software code for these modules as they are described to function herein.

Each enumerators 42 is an executable software routine called upon periodically by the operating system 40 to determine what devices 30a–n are connected to computer 10. The enumerator 42 periodically polls the locations on a specified bus where new peripheral devices 30a–n may be connected to the computer 10 to find any new devices 30a–n. In the preferred embodiment, the devices 30a–n contain a device identification string in a predetermined memory location (not shown) which an enumerator 42 accesses.

Once a peripheral device 30a–n is found and identified, the device identification string for the device is reported by an enumerator 42 and stored in the hardware tree 50. The enumerators collectively build a hardware tree 50 that lists all the physical or hardware devices 30a–n that are connected to the computer 10.

The hardware tree 50 is a software module that accepts and stores the names of the enumerated peripheral devices 30a–n. The hardware tree 50 is typically a hierarchical database stored in volatile memory (not shown) in computer 10. The hardware tree 50 is also loaded with information concerning system resources, obtained from registry 56, that can be used for the enumerated devices 30a–n. Thus, the information stored in the hardware tree 50 includes the names of the executable files, such as device drivers 60 and libraries 61, that are listed in the registry 56 and are available to operate the peripheral devices 30a–n.

The registry 56 is preferably delivered with the preferred operating system 40. The registry 56 includes information about the executable files, such as device drivers 60 and libraries 61, that are in the computer 10, and information about any devices 30a–n that are connected to the computer 10, including device identification strings, configuration information and requirements of different peripheral devices 30a–n for which device drivers 60 and/or dynamic linked libraries 61 are needed. The registry 56 is loaded with the device identification strings for devices 30a–n that are installed on the computer 10 by the configuration manager 46. Thus, the registry 56 contains an up-to-date list of the devices 30a–n that are operably connected to the computer 10.

The configuration manager 46 uses the resource arbitrator 48 to manage enumerated peripheral devices 30a–n. The configuration manager 46 assigns a device driver 60 and/or library file 61 to hardware devices 30a–n in hardware tree 50, as needed. The resource arbitrators 48 are preferably pre-programmed in the operating system 40 to understand the constraints of the computer 10, including standard I/O, memory, hardware interrupts, and DMA channel resources that are available in the computer 10. The configuration manager 46 reviews the hardware tree 50 and assigns the enumerated devices 30a–n to the available resources in the computer 10 based on this information.

The operating system 40 is preferably located in memory in the computer 10 when purchased by the consumer. However, those skilled in the art will recognize that part or all of the operating system 40 may be loaded in or located in other types of memory. Further background information about the above-referenced software modules and the operating system 40 is available from Microsoft Corporation, and in documents published by Microsoft Corporation entitled: "Plug & Play Specifications", "Device Information Files, Chapter 99", "Configuration Manager, Chapter 1", "Plug and Play ISA Specification", "Plug and Play Device Drivers, Chapter 1", "Plug and Play and PCMCIA", and "Plug and Play Introduction". In the preferred embodiment, some device drivers 60 and dynamic linked library files 61 are included with the operating system 40 as delivered, and the registry 56 includes a list of these files.

Figure 5A:
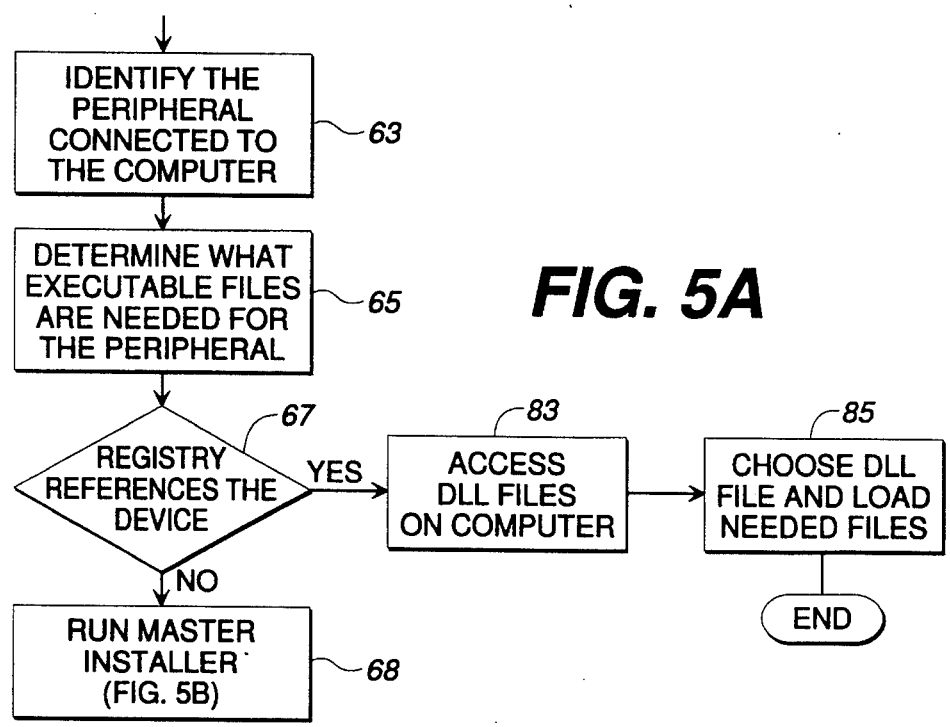
FIGS. 5A–B show flowcharts of the preferred method of finding and accessing files within the single file of FIGS. 2 and 3 to control a peripheral device.

FIG. 5A is a flowchart of the steps for the preferred method of installing the DLL file 64a needed for using the peripheral device 30a in the computer 10. Referring now to FIGS. 1–5A, the preferred steps for accessing and loading the executable files from within the DLL file 64a that are needed for using the peripheral device 30a is set forth.

The peripheral device 30a may be connected at any time before or during use of the computer 10. For purposes of the present discussion, the peripheral device 30a being connected to the computer 10 is a CD-ROM drive. After the peripheral device 30a is connected to the computer 10 via cable 11 and a bus 12a–n, the enumerator 42 associated with that bus identifies the existence of the peripheral device 30a at step 63.

At step 63, the enumerator 42 determines the device identification string for the peripheral device 30a. As stated above, each of the enumerators 42 polls preassigned memory locations on selected busses for peripheral devices 30a–n to determine when one of the devices 30a–n is connected to computer 10, and identifies the particular device 30a–n during step 63. Specifically, an enumerator 42 obtains a device identification string ("DeviceID-XXXXX") from the peripheral device 30a at step 63.

Each device 30a–n has a unique preassigned device identification string loaded in a predetermined location of non-volatile memory that can be read by the configuration manager 46. The device identification string is comprised of a text string that preferably includes the name of the manufacturer of the peripheral device, the type of peripheral device, and the version of the peripheral device. Also, identification strings for compatible devices may be read from the device 30a by the enumerator 42. Thus, a string such as "CompatibleID-XXXX, XXXX" may be read by the enumerator 42. In the preferred embodiment, the text string is encoded in the American Standard for Information Interchange (ASCII), familiar to those skilled in the art. However, other codes could be used.

As an example, a device identification string might be "SCSI\Manufacturer\CD-ROM\Version", indicating that the peripheral device 30a is a CD-ROM device connected to the computer 10 through SCSI port 32, and made by a named manufacturer under a given version number. The name of the device, manufacturer of the device and version number of the device may be assigned unique number strings. The device information collected by the enumerator 42 is stored in the hardware tree 50.

After determining the device identification string for the peripheral device 30a, at step 65 it is determined what executable and non-executable files (device drivers and/or INF files) are necessary to operate the peripheral device 30a. Each enumerator 42 is programmed with a list of the names of device driver files and library files that are written for operation with peripheral devices 30a–n. The enumerator 42 includes a listing of files not loaded in the computer 10, the list being programmed in the enumerator 42. The enumerators 42 associate device identification strings for peripheral devices 30a–n with whatever device driver files and/or library files are needed to operate the peripheral device 30a. This is performed by comparing the device identification string for the peripheral device 30a with the information in the enumerator 42 concerning the requirements of the peripheral devices 30a–n.

At this point, the location of the files needed to operate the peripheral device 30a is unknown. In the preferred embodiment, the DLL file 64a encapsulating the files needed for operation of the peripheral device 30a may be found either on the floppy disk 16 or in the memory 20 of the computer 10.

At step 67, the device identification strings in the registry 56 are examined to determine whether the needed DLL file 64a is in the computer 10, typically on a hard disk (not shown). The registry 56 contains information concerning previously installed devices and compatible devices, if any, including the device identification string assigned to any device 30a–n already installed on the computer 10. Thus, if the peripheral device 30a has previously been installed on and used with the computer 10, the registry 56 will contain the device identification string, or a compatible identification string correlated to the peripheral device 30a. The configuration manager 46 will thus search for an entry in the registry 56 that matches the device identification string for the peripheral device 30a. In default mode, the "Yes" branch is followed from step 67 to step 83 where any DLL files 64a–n in computer memory 20 are analyzed to find the DLL file containing the matching device identification string.

At step 83, the configuration manager 46 proceeds to search DLL files 64a–n in a directory on computer 10, which directory is devoted to storing DLL files 64a–n (and separate INF files if the conventional files are used). The configuration manager 46 searches computer memory 20, typically the hard disk drive, for the INF file 96 within the DLL file 64a that contains the device identification string matching the peripheral device 30a. The configuration manager 46 thus determines which DLL file 64a contains the INF file 96, device driver 97 and library file 99 needed for operating the peripheral device 30a.

If a searched DLL file 64a–n does not contain a matching device identification string for the peripheral device 30a in its encapsulated INF file, the DLL file 64a–n does not include the necessary device driver file and library files needed to operate device 30a. The configuration manager 46 sequentially accesses DLL files 64a–n in the dedicated directory in memory 20 until the needed DLL file 64a is located per the information obtained from the registry 56.

Once the DLL file 64a containing the matching device identification string is found, that file is opened to read the INF file 96, and access the needed VxD device driver file 97 and library file 99 at step 85. At step 85, a loader uses the information in the resources table 89 to load the needed files for execution. Those skilled in the art will recognize that conventional INF files, associated with separate device driver files, may still be located, opened and used with the separate executable files, as was performed in conventional systems before the present invention.

Specifically addressing the loading of the executable files, the VxD device driver file 97 and library file 99 are in line executable format. The loader module reads the location and length of the files from the Name Information section 102 before loading these files for execution by the computer 10. Those skilled in the art are familiar with loaders for loading identified sections of code for execution. The VxD device driver file 97 and library file 99 are loaded for execution by the computer 10. Therefore, in the preferred embodiment, after the DLL file 64a has been found, portions of that file are accessible to the computer 10 to control the peripheral device 30a. The needed files are thus available to computer 10, and the method of preferred embodiment is exited.

Returning to step 67, if no match to the device identification string for the peripheral device 30a is found in the registry 56 in the computer 10, following the "No" branch the configuration manager 46 will call a master installer program 70 at step 68. Thus, if the registry 56 does not contain any information about the peripheral device 30a, the registry 56 will have to be populated with information about the peripheral device 30a. The master installer program 70 will perform a search for the needed DLL file 64a. The master installer program 70 is a software module that is executed when no device identification string matching the device identification string for the peripheral device 30a is found in the registry 56.

Figure 5B:
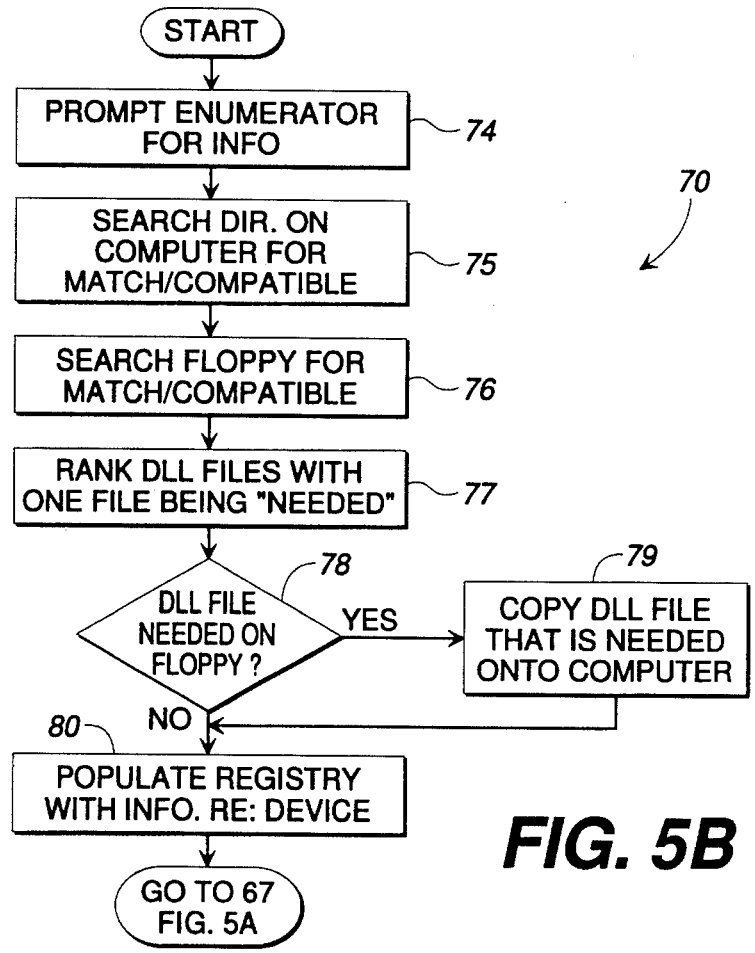

FIG. 5B is a detailed flowchart of the steps taken by the master installer program 70 in the computer 10 to carry out the preferred method of finding the DLL file 64a needed for using peripheral device 30a. Referring to FIG. 5B, at step 74 the master installer program 70 prompts an enumerator 42 (FIG. 4) to provide additional information about the peripheral device 30a. Specifically, the enumerators 42 are loaded with information, including listings of the Device Identification String (DeviceID), Compatible Identification string ("CompatibleID"), and hardware identification string ("HardwareID") for the device 30a. The information will be used to find which DLL files 64a–n in memory 20 or on floppy disk 16 contain executable compatible devices.

The master installer 70 compares the device, compatible, and hardware identification strings with the strings in the INF file in each DLL file 64a–n to find a matching or compatible DLL file 64a–n in floppy disk 16.

At step 75, the master installer program 70 determines if there are any DLL files 64a–n in computer memory 20 matching or compatible with the peripheral device 30a using the information obtained from the enumerator 42 at step 74. If compatible identification strings or hardware identification strings are found in a DLL file 64a–n, the peripheral device 30a can be controlled, monitored, and driven by the files written for the compatible devices 30a–n. Thus executable files in the "compatible" DLL file that are intended for another device 30b–n, can be used to operate the peripheral device 30a.

Put another way, strings of information are obtained from the enumerator 42 regarding the peripheral device 30a. Also, strings of information in each INF file list the devices 30a–n that the executable files in each DLL file 64a–n on are written to operate, as well as listing any devices 30a–n that the executable files in each DLL file 64a–n are compatible with. The strings of information in each INF file in the DLL files 64a–n are compared to the strings of information obtained for peripheral device 30a to determine if a DLL file 64a–n contains matching or compatible files.

Two methods of finding "compatible" strings are used. First, the peripheral device 30a is compatible with certain other devices 30b–n, and the compatible identification strings indicate the relationship. Second, instead of relating one device to another device, executable files can be related to a device. The string of information contained in the INF file 96 cross-reference library files and device driver files that are compatible with the peripheral device 30a and will allow the computer 10 to operate the peripheral device 30a. Thus, certain listed executable files in INF files can be compared to the information regarding the peripheral device 30a to find compatible files.

The DLL files 64a–n are also searched for a device identification string matching the device identification string for peripheral device 30a. This is performed because the user may have manually copied the needed DLL file 64a into the computer memory 20, but the device identification string may not be in the registry 56. Thus, the search at step 83 in FIG. 5A for the DLL file 64a containing a matching device identification string was not performed.

After locating any DLL files 64a–n in computer memory 20 containing a matching device identification string, or a compatible identification string, executable files capable of operating the peripheral device 30a have been located. The names of any matching/compatible DLL files 64a–n are stored in memory 20.

At step 76, the master installer program 70 searches on the floppy disk 16 for INF files in DLL files 64a–n that have entries matching or compatible with the peripheral device 30a, including the device identification string, compatible identification string, or hardware identification string for peripheral device 30a. This step is identical to step 75 above, except that DLL files 64a–n, on the floppy disk 16 are analyzed instead of DLL files in computer memory 20. The master installer program 70 again determines whether any of the strings of information in each INF file in a DLL file matches or is compatible with the peripheral device 30a using the preprogrammed information obtained from the enumerator 42. The names of any matching or compatible DLL files 64a–n on floppy disk 16 are copied into the computer 10.

Thus, when any matching or compatible DLL files 64a–n are found, the master installer 70 automatically copies the names of those DLL files into memory. The names of the DLL files are stored with the names of the compatible DLL files found in computer memory 20 at step 75.

At step 77, the names of all DLL files 64a–n that match or are compatible with the peripheral device 30a are thus gathered in memory 20. A ranking operation is conducted at step 77 to select the best available VxD device driver file 97 and library file 99 for the peripheral device 30a. A DLL file 64a containing a device identification string matching the device identification string for peripheral device 30a has the matching VxD device driver file 97 and is the highest ranked DLL file 64a. However, if a matching device identification string has not been located in a DLL file 64a–n, the DLL files including compatible device identification strings are ranked in the order of the listing of the compatible device identification string within each DLL file 64a–n. So, for example, the first compatible device identification string in a DLL file matched with the highest ranked compatible device identification string in the enumerator 42 is used. The highest ranked DLL file 64a–n is thereby utilized.

If the highest ranked DLL file 64a is on floppy disk 16, as identified at step 78, the master installer program 70 copies the DLL file 64a into the appropriate memory location on computer 10 at step 79. The DLL file 64a is copied into the directory in memory 20 that is dedicated to storing DLL files 64a–n. Thus, the master installer program 70 carries out the method of providing the DLL file 64a to computer 10 in the preferred embodiment.

Regardless of whether the highest ranked DLL file 64a selected at step 77 was found in computer memory 20 or on the floppy disk 16, the registry 56 is populated with information about the peripheral device 30a at step 80. Specifically, the device identification string and the names of the VxD device driver file 97 and library file 99 assigned to the peripheral device 30a are added to the registry 56. At this point, the DLL file 64a is in the directory dedicated to DLL files in computer memory 20 and is identified in registry 56.

Once on the computer 10, the DLL file 64a can be accessed by the configuration manager 46 as set forth above at steps 67, 83 and 85 (FIG. 5A). In the preferred embodiment, after the DLL file 64a containing the needed INF file 96, VxD device driver file 97, and library file 99 is in the appropriate directory in memory 20 and is identified in the registry 56, the VxD device driver file 97 and library file 99 can be installed to control the peripheral device 30a. Thus, the master installer program 70 is exited and the configuration manager executes at step 67 in FIG. 5A. At this point, the needed DLL file 64a is accessed at steps 83 and 85. The INF file 96 is used to load the VxD device driver file 97 and library file 99 for execution as was set forth above.

As an example of the preferred method for loading files from the DLL file 64a, consider the situation when, at boot-up, an enumerator 42 detects a new device 30b connected to the computer 10 with a device identification string "SCSI\*FSC0407\X28AF363". The configuration manager 46 will search in registry 56 for a device identification string that matches the string for device 30b. Presuming that no such string is found in an INF file in computer 10, the master installer program 70 is invoked.

The master installer calls the enumerator 42 and obtains more information regarding the device 30b. The compatible information would preferably appear as follows:

Description="Fred's Sound Card"
CompatibleID-*SBD0400 (Sound Blaster)
HardwareID-28AF363

Multiple listings could appear after the CompatibleID line.

The master installer program 70 searches the INF files within DLL files 64a–n in computer memory 20 for any DLL files that match or are compatible with the device identification string for device 30b. If compatible strings for hardware or software devices are identified, no matching device identification string is found, and no floppy disk is in the floppy disk reader 18, the master installer program 70 prompts the user as follows: "You have installed a new Fred's Sound Card. The operating system can make this device work, however, if this device has an installation diskette, please place it in drive A."

The master installer 70 accepts the users response to the above inquiry to determine if the user wishes to (1) use the compatible files (VxD driver files and/or library files) already in computer 10 at step 81, or (2) access DLL files 64a–n from the floppy disk 16. If the user does not have a floppy disk, the user instructs the master installer program 70 to use a compatible device DLL file 64a–n. The configuration manager 46 quits and the highest ranked DLL file 64a–n containing a compatible INF file(s), device driver file(s), VxD device driver file(s) and/or library file(s) already in the computer 10 are linked and loaded in computer 10 for use with the device 30b. The device 30b is placed under the default control of the compatible files. At this point, the files necessary to use the device 30b are loaded in the computer 10 for execution.

If the user installs a floppy disk 16, the master installer program 70 will access the floppy disk 16 that is loaded into floppy disk reader 18. The master installer program 70 searches the floppy disk 16 for identification strings in INF files in DLL files 64a–n matching or compatible with the peripheral device 30b. The master installer program 70 analyzes each DLL file 64a–n to determine if it contains the files necessary to operate the device 30b. If a DLL file 64a–n does not contain matching or compatible files, the master installer program 70 sequentially accesses the next DLL file 64a–n in the floppy disk 16.

If no matching or compatible string in an INF file in a DLL file 64a–n is found in either the floppy disk or in the computer memory 20, the needed device driver and/or library files are not present and the device 30b cannot be used. A message would be sent to the user to ask the user to make sure the correct floppy disk 16 is loaded in the computer 10, or inform the user that an INF file(s), device driver(s) and library file(s) are needed to control device 30b and must be obtained from another source.

Typically, however, a DLL file containing a matching or compatible string for the device 30b is found. The highest ranked DLL file 64a–n is selected, and if the highest ranked DLL file is on the floppy disk 16, the DLL file is copied into the computer memory 20. In any event, the string identifying the matching or compatible device 30a–n on found in the highest ranked DLL file is loaded into the registry 56, and the master installer program 70 is quit. The configuration manager 46 is then called, reviews information concerning the device 30b found in registry 56, and accesses the newly copied DLL file when needed from memory 20.

Those skilled in the art will appreciate that conventional software development techniques can be used to develop the software called for in the master installer program 70 in FIGS. 5A and B. Specifically, the flow chart in FIGS. 5A and B provide the basis upon which the relevant portions of the configuration manager 46 and the master installer program 70 may be developed.

Software only "peripheral devices" may be installed on computer 10. An example of a software only device is a disk cache. The process for installing such a software only device is the same as set forth above, except that the configuration manager 46 is not informed that a new device 30a–n has been installed. Instead, the DLL file 64a is loaded in the computer 10, such as via the floppy disk 16, and an install button is depressed by the user. The install button invokes the master installer program 70, which searches the DLL file 64a for an INF file 96 containing compatible or matching strings. The remainder of the procedure necessary for initiating the DLL file 64a is as set forth above.

Those skilled in the art will recognize that the user can also load other files into the resources portion 98 of the DLL file 64a, such as properties information. For example, a general properties file (identified by a "PRO" header or the like) may be indexed and included in the resources portion 98 of the DLL file 64a. These properties may include information concerning the creator of the file and the function of the DLL file 64a.

Those skilled in the art will recognize that any number of executable files may be loaded into the resources section 98 of a DLL file 64a according to the preferred embodiment of the present invention. Also, multiple executable or non-executable files in different DLL files 64a–n can be automatically accessed to operate a peripheral device 30a.

The function of the executable files need not be limited to controlling peripheral devices. The present invention will allow executable files to be inserted into the DLL file 64a and used separately from the DLL file 64a for any purpose for which an executable file may be used.

From the foregoing description, it will be apparent that the present invention provides a single file in new executable format, the DLL file 64a, that contains all the files that are necessary to install or connect a peripheral device 30a to a computer 10. Furthermore, combining all of the files into a single file allows for easy installation of all device drivers and/or library files needed for a peripheral device.

In view of the foregoing description of the preferred embodiment in its intended environment, other embodiments of the present invention will suggest themselves to those skilled in the art. Therefore, the scope of the present invention is to be limited only by the claims below and equivalents thereof.

I claim:

1. In a computer system including a microprocessor and an operating system for controlling said computer system, a memory device connectable to said computer system, said memory device storing an executable file formatted in a predetermined format and accessible by said operating system, said executable file including a resources section containing data associated with resources of said computer system, said memory device further comprising:

an executable code section containing executable code for controlling a peripheral device; and a non-executable text section containing data defining selected characteristics of said peripheral device and identifying that said executable code section is located within said resources section.

2. The memory device of claim 1 wherein said executable file is a dynamic link library file.

3. The memory device of claim 2 wherein said executable code section is a device driver file.

4. The memory device of claim 3 wherein said data of said non-executable text section identifies said peripheral device.

5. The memory device of claim 1 wherein said executable file further includes a resources table in the executable file, said resources table containing identifiers that identify the location of said non-executable text section and said executable code section within said resources section.

6. The memory device of claim 1, wherein said predetermined format is the New-Style Executable File Format for Windows.

7. A memory device for storing data and executable code, the memory device accessible by an operating system running on a computer system and comprising an executable file stored in said memory device and formatted in a predetermined format said executable file including first and second headers, a resources table in said second header, a first executable section of code, a second executable section of code in said predetermined format, and a resources section containing data for resources of said computer system, the memory further comprising:

an executable code file containing executable code within said resources section;

a non-executable text file containing data supplying an indication to said operating system that said executable code file is located within said resources section; and identifiers in said resources table that identify the location of said executable code file and non-executable text file within said executable file.

8. The apparatus as recited in claim 7 wherein said executable code file is a device driver file and said non-executable text file is an INF file.

9. The memory device of claim 7, wherein said data of said non-executable text file identifies a peripheral device that can be driven by said device drive file, said peripheral device associated with said computer system.

10. The memory device of claim 7, wherein said predetermined format is the New-Style Executed File Format for Windows.

11. A memory device for storing data and executable code, said memory device connected to a microprocessor of a computer system, said memory device comprising:

a file stored in said memory device and formatted in new executable format, wherein said file can be accessed by an operating system and at least portions of said file can be accessed by a disk operating system running on said computer system, said file including:

a first header primarily for use by said disk operating system;

a second header for use by said operating system;

a resources table in said second header;

a section of code in new executable format primarily for operation with said operating system;

a resources section containing data for resources of said computer system;

an executable code file containing executable code within said resources section; and an identifier in said resources table that identifies and points to the location of said executable code file within said resources section.

12. The apparatus of claim 11 wherein said executable code file is a device driver file used by said operating system to control a peripheral device connected to the computer system.

13. The memory device of claim 11, wherein said resources section further comprises a non-executable text file containing data which identifies that said executable code file is located within said resources section.

14. The memory device of claim 13, wherein another identifier in said resources table which identifies and points to the location of said non-executable text file within said resources section.

15. In a computer including at least one memory device and an operating system running on said computer, and a plurality of files in a predetermined format, each file stored in one of said memory device and accessible by said operating system, each file including a preassigned section comprising an executable file and a non-executable text file, the non-executable text file containing data identifying one of the peripheral devices that is connectable to the computer and is operable with executable code of the executable file, each file further including a header that identifies and points to the location of the executable file and the non-executable text file, a method of installing a portion of one of the files on the computer to control a selected one of the peripheral devices connected to the computer comprising the steps of:

identifying said selected peripheral device determining a particular for operating said selected peripheral device in response to identifying said selected peripheral device;

reading said data of said non-executable text file to determine if said file contains said particular executable file loading said executable code of said particular executable file to enable said computer to control said selected peripheral device in the event that said particular executable file is contained in said file.

16. The method of claim 15 wherein said loading step comprises the steps of determining the location of said particular executable file by reading said header and installing said particular executable file on the computer.

17. The method of claim 16 wherein the predetermined format for said file is new executable format.

18. In a computer including at least one memory device and an operating system running on said computer, and a plurality of files in a predetermined format, each file stored on one of said memory device and accessible by said operating system, each file including a preassigned section comprising an executable file and a non-executable text file, the non-executable text file containing data identifying one of a plurality of peripheral devices operable with executable code of the executable file, each file further including a header that identifies and points to the location of the executable file and the non-executable text file, a method of installing a portion of one of the files to control a selected one of the peripheral devices connected to the computer, comprising the steps of:

identifying a certain one of the files within said memory device having the executable file for operating said selected peripheral device;

reading said data of said non-executable text file of said certain file to determine if said certain file contains said executable file for operating said selected peripheral device; and in the event that said executable file is located in said certain file, reading said header of said certain file to determine the location of said executable file within said certain file, and loading said executable code said executable file in said certain file to enable the computer to control said selected peripheral device.

19. The method of claim 18, wherein said loading step comprises the steps of determining the location of said executable file by reading said header and installing said particular executable file on the computer.

20. The method of claim 18, wherein the predetermined format for said file is the New-Style Executive File Format for Windows.

21. A computer system executing an operating system for controlling the operations of said computer system, comprising:

a microprocessor;

a memory device, coupled to said microprocessor and accessible by said operating system, including an executable file formatted in predetermined format and stored in said memory device, said executable file including:

an executable code section containing executable code for controlling a peripheral device; and a non-executable text section containing data defining selected characteristics of said peripheral device and identifying that said executable code section is contained within said executable file, said operating system operative to access said data of said non-executable text section to determine that said executable code section is within said executable file and available for installation on said computer system.

22. The apparatus of claim 21, wherein said executable code section is a device driver file and said data in said non-executable text section identifies said peripheral device.

23. The apparatus of claim 22, wherein said executable code further includes a resources table containing identifiers that identify the location of said non-executable text section and said executable code section within said executable file.

24. The apparatus of claim 23, wherein said predetermined format is the New-Style Executable File Format for Windows.

* * * * *